July 27, 1948.  O. L. MILLER  2,445,918
CORE BOX CUTTER
Filed July 19, 1944  3 Sheets-Sheet 1

Inventor
Olen L. Miller,
By William T. Geer
Attorney

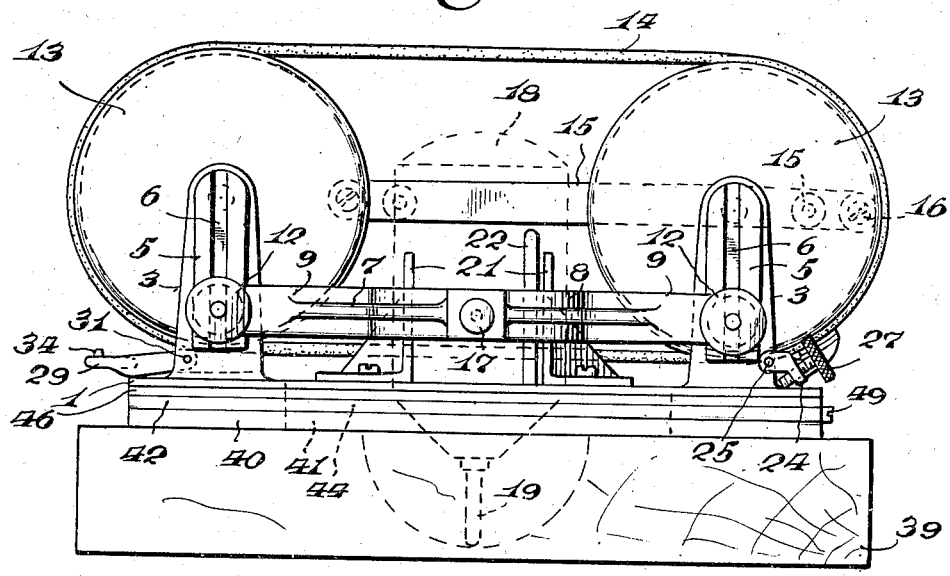
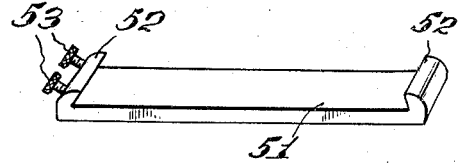
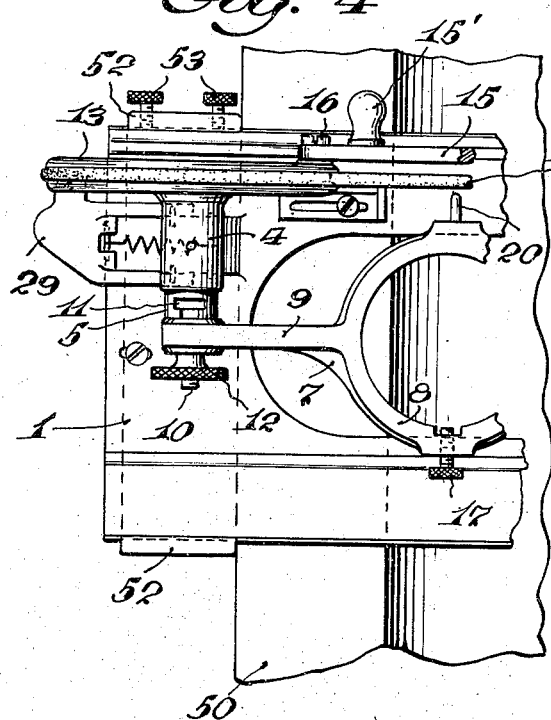

July 27, 1948.  O. L. MILLER  2,445,918
CORE BOX CUTTER
Filed July 19, 1944  3 Sheets-Sheet 3
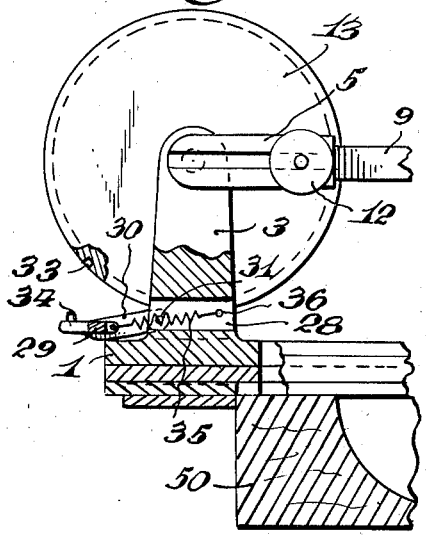
Fig. 6
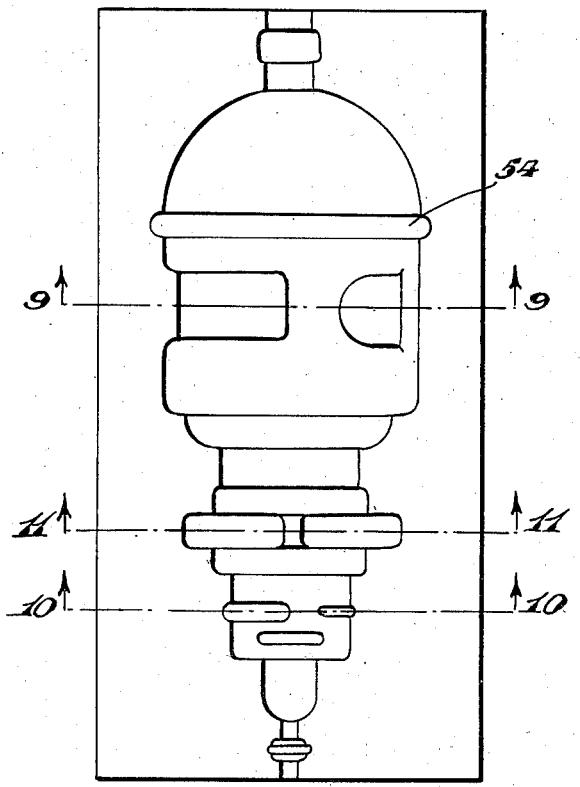
Fig. 8
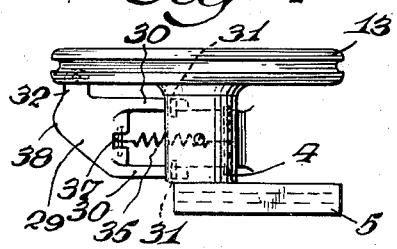
Fig. 7
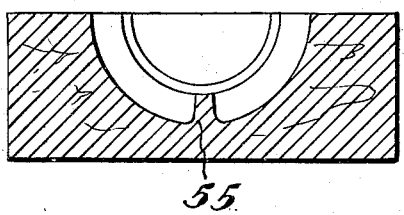
Fig. 11
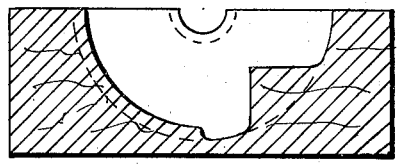
Fig. 9
Fig. 12
Fig. 10
Inventor
Olen L. Miller,
By William J. Geier
Attorney Patented July 27, 1948

2,445,918

UNITED STATES PATENT OFFICE 2,445,918

CORE BOX CUTTER

Olen L. Miller, Washington, D. C.

Application July 19, 1944, Serial No. 545,711

11 Claims. (Cl. 144—136)

This invention relates to core box cutters, and pertains more particularly to devices or mechanisms for quickly and accurately forming core boxes or patterns from any suitable material.

Heretofore, great difficulty has been encountered in cutting core boxes and/or patterns as used in metal founding or in the plastic arts, due to the fact that the necessary and intricate operations incident thereto are usually performed by hand, which not only requires a vast amount of skill on the part of the operator, but which are extremely laborious and time-consuming. Further, prior to the instant invention, extreme difficulty has been encountered in attempts to quickly and accurately form irregular shapes.

While core boxes and patterns are usually formed from wood stock, numerous other materials, including metal or plastics can also be used and consequently it will be readily apparent that the instant invention can be quickly and easily adapted for working upon such other materials with equally rapid and accurate results. Further, the device of the instant application may readily be adapted for grinding operations or the like.

In order to overcome the foregoing and other disadvantages encountered in the prior art, it is the primary important object of this invention to provide a device of the above character which is readily adapted for the rapid and accurate cutting of any irregular or uniform design in a core box or pattern, which is based upon a circle, regardless of whether such design is of a concave or convex configuration as the case may be, and for performing the operations known as routing, taining or the like.

Another important object of this invention is to provide a device of the above character which, during the cutting of core boxes or patterns, will automatically provide the proper amount of clearance or draft around fillets, pads, bosses or ribs, etc., a necessary and vital requirement in the art so as to allow for the ready removal of the sand or other core, due to the fact that the cutting member is always perpendicular to the stock when the latter is being formed into the desired shape.

Another important object of this invention is to provide a device of the above character whereby varying diameters may be quickly and accurately worked in successive steps, either longitudinally or transversely of the stock.

Another important object of this invention is to provide a device of the above character which can be quickly and accurately adjusted for the cutting of a concave configuration, as in core boxes, or for the cutting of a convex configuration, as in patterns, as desired.

Another important object of this invention is to provide a device of the above character having means for holding the cutter in a predetermined set position during the operations of grooving, fluting or the like, or for holding the cutter in its inoperative position.

A further object of this invention is to provide a device of the above character which is adapted for use with a motor driven cutter wherein the motor is carried by the device, or with a cutter which is carried by the device and driven by a flexible shaft or other suitable connection to a remote source of power.

Still another important object of this invention is to provide a device of the above character which is of simple construction, efficient and accurate in operation and one which can be readily manufactured and placed upon the market at a reasonable cost.

The foregoing and other objects and advantages of this invention will be apparent throughout the course of the following description.

In the accompanying drawings forming a part of this specification, and in which like reference characters are employed to designate like parts throughout the same, Figure 1 is a top plan view of the invention with portions of the auxiliary support shown in dotted lines.

Figure 3 is a front elevation of the invention, showing the device mounted upon suitable stock to be formed into a core box and with the motor driven cutter in vertical position.

Figure 4 is a fragmentary top plan view of the invention with one of a pair of guide members attached thereto, and which may be substituted for the auxiliary support shown in Figures 1, 2 and 3.

Figure 5 is a perspective view of one of a pair of the guide members which may be substituted for the auxiliary support shown in Figures 1, 2 and 3.

Figure 6 is a fragmentary view partly in section showing a latch mechanism for holding the operating mechanism at zero setting.

Figure 7 is a top plan view of the latch mechanism of Figure 6.

Figure 8 is a top plan view of one type of completed core box which may be constructed by this invention.

Figure 9 is a vertical sectional view on the line 9—9 of Figure 8.

Figure 10 is a vertical sectional view on line 10—10 of Figure 8;

Figure 11 is a vertical sectional view on line 11—11 of Figure 8; and

Figure 12 is a vertical sectional view of another type of core box operation which may be performed by this invention in which a convex shape is provided.

Figure 1:
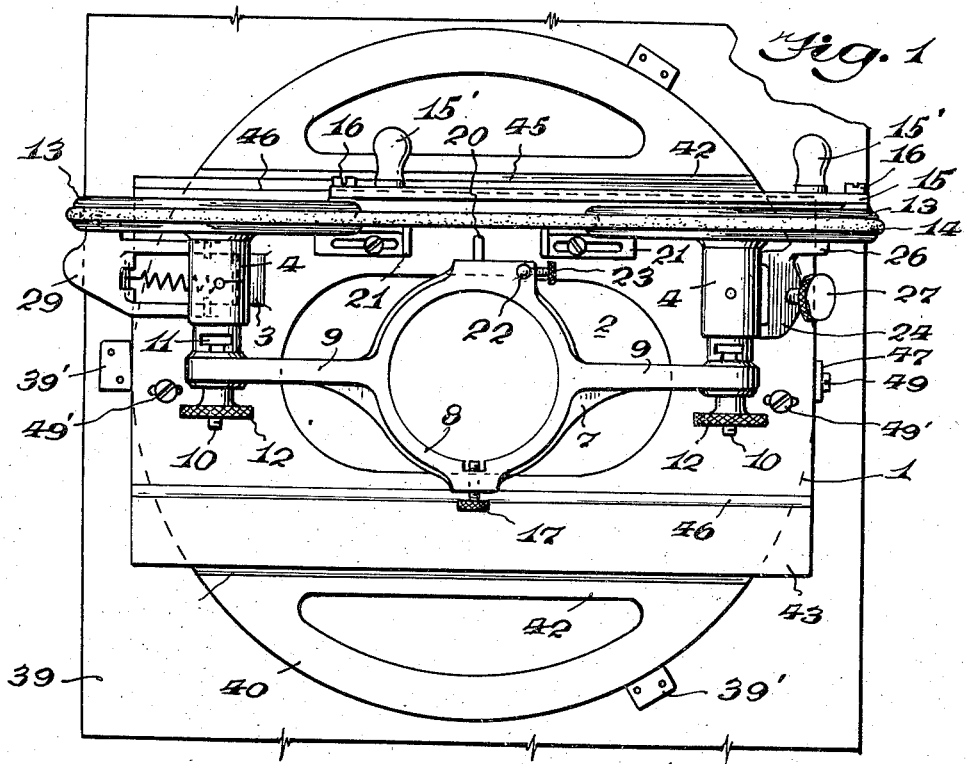

Referring now in detail to the drawings, wherein for the purpose of illustration, is shown a preferred embodiment of my invention, the reference numeral 1 designates a substantially rectangular base member having a substantially centrally disposed elongated opening 2 therethrough of any desired shape.

Rising vertically from the base member 1, adjacent each of the ends of the latter is a standard 3. Each of the standards 3 has its upper end formed with a tubular sleeve or bearing 4 extending in a direction at right angles to the longitudinal extent of the base member 1.

Rotatably mounted in each of the bearings 4 is a crank shaft (not shown) having a crank arm 5 formed on its inner end.

Each of the crank arms 5 has its outer face formed with an outwardly facing slot 6 extending throughout the entire length thereof and which slot is of substantially T-form when viewed in section or in end elevation.

Movably mounted upon the crank arms 5 for varying adjustments therealong is a rigid connecting element 7 having a motor supporting yoke or ring-like central portion 8 and a pair of oppositely disposed and outwardly extending arms 9—9. The arms 9—9 are each adjustably connected to its cooperating crank arm 5 by means of a bolt 10 having a head 11 slidably engaged within the slot 6. The opposite end of the bolt 10 is screw-threaded for the reception of a knurled nut 12 which is adapted to engage and bind its corresponding arm 9 against the outer face of the crank arm 5 so as to hold the motor supporting yoke 8 in predetermined adjusted positions with respect to the work being operated upon.

Keyed to each of the ends of the crank shafts opposite to the crank arms 5, by any suitable means, is a hand wheel 13 providing a pair of alined pulleys which are interconnected for unitary rotative movement by an endless belt 14 disposed about their peripheries or any other suitable interconnecting driving means.

In order to insure that the hand wheels 13 will rotate in the same direction in unison, and to prevent either thereof from rotating in a direction opposite to the other, there is provided a pitman rod 15 having each of its respective ends pivotally connected to a hand wheel 13, by any suitable means, such as a locking screw 16, or the like. Secured to the pitman rod 15 is a pair of spaced operating handles 15'.

Mounted for vertical adjustment within the yoke 8 by means of a locking screw 17 is a motor housing 18 carrying a rotatable cutting tool 19.

A horizontally extending rib-stop or pin 20 is carried by the yoke 8 at a point substantially opposite to the locking screw 17 and is adapted to engage a pair of opposed right angle limit stops 21 adjustably mounted upon the base member 1 for movement toward and away from each other so as to predetermine the amount of swinging or oscillating movement which may be imparted to the yoke 8 and motor and cutting tool with respect to the work.

An additional vertically adjustable stop pin 22 is slidably mounted in the yoke 8 and is held in its adjusted position by means of a locking screw 23. The function of the stop pin 22 is to stop the cutter 19 in its arcuate movement at less than 45°, in instances where it is desired to make shallow cuts, while the stops 21 are used to limit the arcuate movement of the cutter when the arc is more than 45°.

A brake arm 24 has one of its ends suitably pivoted to one of the standards 3 as at 25 and has its opposite free end provided with a brake shoe 26 which is adapted to frictionally engage against an adjacent portion of one of the hand wheels 13. A headed adjusting screw 27 is adapted to bear against the standard 3, whereby when the screw is moved inwardly toward the standard, leverage is applied to the brake arm to move the same about its pivot and thereby force the brake shoe against said adjacent hand wheel so as to lock the latter in any desired position of adjustment.

One of the standards 3 is provided adjacent its lower end with an opening 28. A latch member 29, the operation of which will be hereinafter more fully described, is provided with a pair of spaced legs 30, 30 which straddle and are pivoted to the said standard 3 as at 31, 31 at either side of the opening provided with an offset portion 32 which is adapted to underlie the peripheral face of one of the hand wheels 13. The said hand wheel 13 is formed with a recess 33 which is adapted to receive a lug or pin 34 carried by the offset portion 32 of the latch member. A tension spring 35 has one of its ends anchored within the opening 28 by a transverse pin 36, while its opposite end is connected to the latch member between the legs 30, 30, as at 37. The latch member 29 is further formed with a forwardly extending portion or protuberance 38 whereby the same may be moved toward or away from the hand wheel 13 by a finger of the operator.

To mount the device, thus far described upon the work for rotative movement throughout 360°, about a vertical axis with respect to the work and for horizontal sliding and rotative movement in any direction relative thereto, when it is desired to work a spherical or elbow design, there is provided an auxiliary support which is adapted to be centered upon a work piece 39 by means of centering blocks 39'.

The auxiliary support for the device, consists of a disk, or ring-like plate 40 having an opening 41 therethrough corresponding to the opening in the base member 1. Disposed upon the upper surfaces of the disk 40 are a pair of spaced opposed tangentially extending guide rails 42 disposed one each on either side of and parallel to the longitudinal extent of said opening 41.

Mounted upon the disk 40 for adjustable sliding movement thereon between the guide rails 42, is an elongated substantially rectangular plate 43 which is also provided with an opening 44 therethrough corresponding to and registering with the openings 2 and 41 in the base member 1 and disk 40 respectively. A locking screw 45 carried by one of the rails 42 is adapted to engage and maintain the plate 43 in the desired position of adjustment relative to the disk 40.

The plate 43 is also provided upon its upper surface with a pair of guide rails 46 bordering the sides of its opening 44 and which extend substantially parallel to the guide rails 42 of the disk 40.

The base member 1 is adapted to be mounted for sliding movement upon the plate 43 between the guide rails 46 and is held in the desired position of adjustment relative thereto by means of a depending lug 47 which is rigidly secured to one end of the base member 1 by means of a screw 49.

The lower free end of the lug 47 extends downwardly over the adjacent end of the plate 43 and is provided with a screw-threaded opening for the reception of an adjusting screw 48, the inner end of which latter has screw-threaded connection in an opening formed in the said adjacent end of the plate 43 whereby inward movement of the screw will engage and cause relative sliding movement of the base member 1 therebetween, so as to obtain a more accurate or refined adjustment between the base 1, disk 40 and plate 43 to thereby set the tool with respect to the center line of the work prior to its swinging or oscillating movement through all of the openings and into a cutting engagement with the work. After accomplishing the last named adjustment, the base 1 and plate 43 are secured together by means of screws 49'.

In the event it is desired to operate upon a core box of the type shown at 50 in Figure 4 of the drawings, for forming a straight line or cylindrical core box, the device is removed from the auxiliary supporting disk 40 and a pair of guide members 51, shown in Figure 5, are substituted therefor, by connecting the same in the manner shown in Figures 4 and 6.

The guide members 51 consist of elongated bars having upwardly and inwardly directed end portions 52. The guide members are secured in spaced relation upon the under side of the base member 43 by screws 53 or any other suitable means and are disposed so as to lie one on each side of the work to form in effect a downwardly facing trackway by means of which the cutting device may be moved back and forth with respect to the stock while the cutting tool is permitted to move in a direction transversely thereof, whereby designs of various diameters may be formed in the stock.

Figure 2:
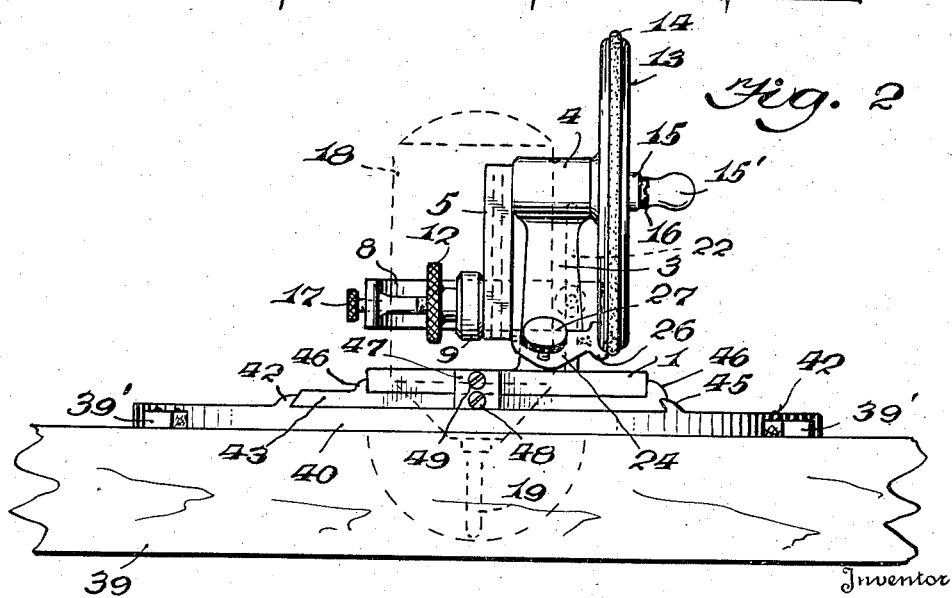
Figure 2 is an end elevation of the invention as seen from the right of Figure 1.

In operating the device as depicted in Figures 1 to 3 inclusive, the auxiliary support consisting of disk 40 and plate 43 is first placed upon the work 39 and centered with respect to the desired design to be cut, by means of detachable blocks 39' which are temporarily secured to the work by nails or any other suitable fastenings.

The device is then placed upon the auxiliary support by disposing the base member 1 thereof between the guide rails 46 of the plate 43. The motor is then initially adjusted vertically in the yoke 8. In order to obtain the desired depth so as to form a half circle cutter 19 and the arms 9 of the connecting element 7 are then moved to the desired position with respect to the cranks 5 so as to obtain the desired amount of throw which gives the depth of each cut and desired diameter of the box.

In order to assure that the crank arms 5 will operate in unison, the same are swung to a horizontal position and there maintained by moving the latch member 29 in an upward direction so that lug 34 will seat in the recess 33 and thereby hold the hand wheels against movement. The latch member 29 will remain either in its engaged or disengaged position because same can be moved above or below the center line of the pull of the spring 35.

The knurled nuts 12 are then loosened so as to permit movement of the yoke 8 and arms 9 to the desired position of adjustment along the horizontally disposed crank arms 5 to thereby predetermine the arc through which the cutter will be permitted to swing and consequently predetermine the depth of the cut to be made. After this operation the nuts 12 are then tightened, the proper stops either 21 or 22 are set, and the machine is ready to be moved over the work. In the event it is desired to form a core box, such as disclosed in plan in Figure 8, the cutter 19, by means of hand wheels 13, the yoke 8, and arms 9, is swung by movement of the crank arms 5 in a downward arc.

In forming the semi-circular groove 54 it will be obvious that the cutter is swung throughout 180°. To form the rib 55 as shown in Figure 11, it will be apparent that the cutter is swung downwardly through substantially 90° in an arc to a predetermined point to form one side of the rib and when such cut has been completed the cutter is then started on the opposite side and swung downwardly through substantially 90° to a predetermined point on the other side of the rib.

It is further believed to be obvious from the foregoing examples, that the various cross sections disclosed in Figures 9, 10 and 11, can easily be accomplished by predetermined adjustment of the yoke 8 and arms 9 along the length of the crank arms together with the sliding and swinging movements of the base 1 upon the auxiliary support.

If it is desired to form the core box or other work with raised portions of circular or convex configuration, the yoke 8 and arm 9 together with the crank arms 5 are swung to a position opposite to that shown in Figure 3 so that the cutter will be in a position above the design to be formed. For example, see the cross sectional view of Figure 12.

During the operation of the device, latch member 29 and lug 34 may ride on the peripheral face of the wheel 13 while making the desired cut. When a circular cut is completed the latch pin 34 will automatically engage in latch pin 33 which is the zero position for re-setting and/or for starting.

From the foregoing it will be seen that any design of concave or convex configuration, based upon a circle, may be readily accomplished by various predetermined adjustments so as to swing the cutter in either an upward or downward arc. Thus the machine when combined with an auxiliary support, as shown in Figures 1, 2 and 3, will have substantially universal movement in horizontal or vertical planes. When the machine is used with the guide members 51 shown in Figure 5, straight line core boxes may be readily formed with transverse grooves, ribs, pads or bosses.

It is to be understood that the form of my invention, herewith shown and described, is to be taken as a preferred example of the same, and that various changes in the shape, size and arrangement of parts may be resorted to, without departing from the spirit of my invention or the scope of the subjoined claims.

Having thus described my invention, what I claim as new and desire to secure by Letters Patent is:

1. A device of the character described including an auxiliary support adapted for rotation relative to the work to be operated upon, a plate slidable on said auxiliary support, a base member slidable on said plate, the auxiliary support, plate and base member each having an opening therethrough for register each with the other, spaced standards carried by the base, a yoke movably connected to said standards for movement in a vertical plane throughout 360°, a motor-driven tool mounted in said yoke for movement therewith, and means for actuating the yoke and thereby the tool through all of said openings into engagement with the work.

2. A device of the character described including a base member having an opening therethrough, a pair of spaced standards carried by the base member adjacent to said opening, a crank arm mounted upon the upper end of each of said standards, a yoke pivotally connecting said crank arms above said opening for clockwise and counterclockwise movements in a vertical plane throughout 360°, a motor driven tool carried by said yoke for movement through said opening, and means interconnecting said crank arms for actuating the latter and thereby the crank arms for causing movement of the tool relative to said opening.

3. A device of the character described includinging a base member having an opening therethrough, a pair of spaced standards carried by the base member adjacent to said opening, a crank arm mounted upon the upper end of each of said standards, a yoke pivotally connecting said crank arms above said opening, a motor driven tool carried by said yoke for movement through said opening, means interconnecting said crank arms for actuating the latter and thereby the yoke and tool, and brake means for engaging the actuating means for holding the same in varying predetermined positions.

4. A device of the character described including a base member having an opening therethrough, a pair of spaced standards carried by the base member adjacent to said opening, a crank arm mounted upon the upper end of each of said standards, a yoke pivotally connecting said crank arms above said opening, a motor driven tool carried by said yoke for movement through said opening, means interconnecting said crank arms for actuating the latter and thereby the yoke and tool, latch means for holding the actuating means in a predetermined zero position during setting of the tool relative to the work, and brake means for engaging and holding the actuating means in varying inoperative positions.

5. A device of the character described in accordance with claim 3, wherein there is work engaging guide means secured to said base member.

6. A device of the character described including an apertured support engaging disk having its upper face provided with a pair of spaced parallel guide rails, an apertured slide member movably mounted upon the upper surface of said disk between said guide rails and having its upper face provided with a pair of spaced parallel guide rails, an apertured base member movably mounted upon the upper surface of said slide between the guide rails of the latter, a pair of spaced standards carried by said base, a rotatable arm carried by each of said standards for movement in a vertical plane throughout 360°, a yoke connecting said arms for movement therewith, a motor-driven tool carried by said yoke, and actuating means connecting said arms for moving the latter and thereby the yoke and motor-driven tool in clockwise and counter-clockwise directions in a vertical plane with respect to the disk, slide and base members.

7. A device of the character described in accordance with claim 6, wherein there is means for engaging the actuating means for holding the latter in varying predetermined positions.

8. A device of the character described in accordance with claim 6, wherein there is latch means for holding the actuating means in a predetermined zero position during setting of the tool relative to the work to be operated upon.

9. A device of the character described in accordance with claim 6, wherein there is means connecting the slide and base members for adjusting the base member transversely of the disk and independently of the latter.

10. A device of the character described in accordance with claim 6, wherein there is means for adjusting the connection between the arms and yoke for regulating the vertical movement of the motor-driven tool with respect to the disk, slide and base members.

11. A core box cutter of the character described including, a base, a pair of spaced supports carried by the base, a crank arm rotatably mounted upon each of said supports in spaced relation to said base, a carrier member pivotally connecting said crank arms for clockwise and counter-clockwise movement throughout 360° in a plane perpendicular to the plane of said base, and a rotary driven tool mounted on said carrier member for movement therewith with respect to said base.

OLEN L. MILLER.

REFERENCES CITED

The following references are of record in the file of this patent:

UNITED STATES PATENTS

| Number | Name | Date |
| --- | --- | --- |
| 704,373 | Rawson | July 8, 1902 |
| 1,234,016 | Halterbeck | July 17, 1917 |
| 1,449,084 | Billingsley | Mar. 20, 1923 |
| 1,486,121 | Beckner | Mar. 11, 1924 |
| 1,504,499 | Peterson | Aug. 12, 1924 |
| 1,532,683 | Carter | Apr. 7, 1925 |
| 2,116,248 | Moser | May 3, 1938 |
| 2,237,751 | Maillart | Apr. 8, 1941 |